United States Patent [19]

Berrocal et al.

[11] Patent Number: 5,216,129
[45] Date of Patent: Jun. 1, 1993

[54] PRODUCTION OF KAPPA-CASEINO-GLYCOMACROPEPTIDE

[75] Inventors: Rafael Berrocal, St-Legier; Jean-Richard Neeser, Lausanne, both of Switzerland

[73] Assignee: Nestec S.A., Vevey, Switzerland

[21] Appl. No.: 672,889

[22] Filed: Mar. 21, 1991

[30] Foreign Application Priority Data

Apr. 27, 1990 [CH] Switzerland ............... 1448/90

[51] Int. Cl.$^5$ ............... C07K 15/14; C07K 3/24
[52] U.S. Cl. ................... 530/360; 530/407; 530/395
[58] Field of Search ............... 530/360, 361, 416, 417, 530/322, 362, 323; 514/8, 12, 21

[56] References Cited

U.S. PATENT DOCUMENTS

| | | | |
|---|---|---|---|
| 4,042,575 | 8/1977 | Eustache | 435/272 |
| 4,042,576 | 8/1977 | Eustache | 530/322 |
| 4,994,441 | 2/1991 | Neeser | 514/8 |
| 5,061,622 | 10/1991 | Dosako et al. | 435/68.1 |

FOREIGN PATENT DOCUMENTS 0291264  11/1988  European Pat. Off. .
2288477   5/1976  France .

OTHER PUBLICATIONS

Zittle and Custer, Journal of Dairy Science, Nov. 1963, vol. XLVI, No. 11, pp. 1183–1188.
McKenzie and Wake, An Improved Method for the Isolation of $k$-Casein, Biochem. Biophys Acta 47:240, 1961.

Primary Examiner—Jeffery E. Russel
Assistant Examiner—P. L. Touzedu
Attorney, Agent, or Firm—Vogt & O'Donnell

[57] ABSTRACT

Kappa-caseino-glycomacropeptide (CGMP) is industrially produced from a whey product concentrated in proteins partly freed from lactose by selective precipitation of the residual whey proteins with ethanol from the supernatant collected after separation of the flocculate obtained by heat treatment in acidic medium.

12 Claims, No Drawings

PRODUCTION OF KAPPA-CASEINO-GLYCOMACROPEPTIDE

BACKGROUND OF THE INVENTION

This invention relates to a process for the production of kappa-caseino-glycomacropeptide (hereinafter referred to as CGMP).

CGMP is a sialylated macropeptide which is formed by the action of rennet or pepsin on kappa-casein from the milk of mammals.

In one known laboratory process for the preparation of CGMP, a starting material of lactic origin, such as for example an acidic casein or a caseinate hydrolyzed by rennet, or even a demineralized, lactose-free sweet whey, is treated with trichloroacetic acid to precipitate the proteins, the supernatant is collected and dialyzed and, finally, the dialyzate is dried. However, this process is not an industrial process.

According to European Patent Application Publication No. 291 264, CGMP may be produced on an industrial scale by hydrolysis of acidic casein or sodium or calcium caseinate with rennet which leads to the coagulation of para-kappa-casein. The supernatant is then acidified to pH 4 - 5 to precipitate the calcium phosphocaseinate. After separation of the precipitate, the solution is neutralized, demineralized by reverse osmosis and, finally, is concentrated and dried.

According to French Patent Application No. 2,288,477, glycoproteins and sialic acid may be industrially produced from whey emanating from cheese production by flocculation of the whey proteins, recovery of the supernatant and ultrafiltration of the supernatant using membranes having a cutoff threshold of approximately 15,000 dalton which produces a retentate containing the sialo-glycoproteins from which sialic acid is obtained by hydrolysis with sulfuric acid, neutralization with barium hydroxide, separation of the barium sulfate precipitated and isolation of the sialic acids from the supernatant by ion exchange.

None of the industrial processes mentioned above gives a CGMP with the purity desirable for its use as an anti-infectious agent, i.e., containing hardly any proteins, lactose and residual minerals and most of the sialic acids.

The problem addressed by the present invention was to produce CGMP having the qualities mentioned above on an industrial scale.

SUMMARY OF THE INVENTION

Accordingly, the present invention relates to a process for the production of kappa-caseino-glycomacropeptide in which the proteins of a whey product concentrated in proteins partly freed from lactose are flocculated, resulting in a precipitate and a first supernatant, and the first supernatant is collected and concentrated by ultrafiltration, leading to a retentate.

The process according to the invention is characterized in that the retentate is treated with ethanol, which produces a precipitate and a second supernatant, the second supernatant is collected and is then dried.

DETAILED DESCRIPTION OF THE INVENTION

The process according to the invention may be carried out using a whey product, for example sweet whey obtained after separation of casein coagulated with rennet, concentrated and partly freed from lactose, as starting material. A corresponding whey concentrate demineralized, for example, by electrodialysis and/or ion exchange and/or reverse osmosis may also be used. A concentrate of sweet whey proteins intensively freed from lactose and obtained by ultrafiltration and then diafiltration (ultrafiltration with washing) is preferably used. These starting materials may be present in liquid form or in the form of a powder, in which case they are dispersed in preferably demineralized water for their subsequent treatment. These starting materials may of course emanate from the milk of ruminants, such as cows, goats, sheep or cow-buffalos.

The flocculation of the whey proteins presupposes intensive denaturing of the proteins (above 90%). It is carried out by a heat treatment for 10 to 30 mins. at 80° to 100° C., the lowest temperature corresponding to the longest holding time and *vice versa*, for example for 20 minutes at 90° C. The pH value during the heat treatment is 4–7 and preferably of the order of 6. $CaCl_2$ is preferably added at a pH of approximately 6 in such a quantity that the concentration of free calcium ions is above 5 mM to promote aggregation of the whey proteins and their insolubilization during the heat treatment.

After flocculation, a gel is formed and is then diluted, preferably with demineralized water. The suspension obtained is then cooled and its pH value is adjusted to approximately 4.5 by acidification with an aqueous solution of an organic or mineral acid, for example hydrochloric acid. A precipitate of denatured whey proteins is formed and may be separated from the supernatant by any suitable method of separation, for example filtration or centrifugation.

The supernatant is then subjected to ultrafiltration by passage through membranes having a nominal cutoff power of 5,000 to 20,000 dalton. Membranes suitable for the purposes of the invention may be organic or mineral. The ultrafiltration step is preferably continued until approximately half the initial volume has been concentrated and is followed by diafiltration, i.e., the addition of water, preferably demineralized water, to constant volume, i.e., the flow rate of the water entering the module is adapted to the flow rate of the permeate issuing from the module. The object of the ultrafiltration and the diafiltration is to reduce the content of minerals in the retentate.

The CGMP is extracted from the retentate by addition of ethanol, preferably absolute ethanol. This essential step ensures selective enrichment of the solution with CGMP by precipitating almost all the residual soluble proteins. The amount added depends on the concentration of proteins in the solution. An excessively small addition results in only partial precipitation of the proteins and, hence, adversely affects the purity of the CGMP. On the other hand, an excessively large addition of ethanol would run the risk of promoting the precipitation of non-protein nitrogen-containing compounds, such as CGMP, to the detriment of the yield. An addition of 5 to 25% alcohol, based on the volume of the solution, gives satisfactory results. The pH of the solution should be 4–5 and is preferably adjusted to 4.5 to ensure optimal precipitation of the proteins. The pH is adjusted by addition of an aqueous solution of an organic or mineral acid, preferably hydrochloric acid.

After filtration and concentration, for example by evaporation, the concentrate is dried, for example by spray-drying or freeze-drying.

The desialylated CGMP may optionally be prepared by enzymatic or preferably acidic hydrolysis from the preceding CGMP.

EXAMPLES

The invention is illustrated by the following Examples in which parts and percentages are by weight, unless otherwise indicated.

The total nitrogen (TN) is determined by the Kjeldahl method as is the non-protein nitrogen (NPN) after precipitation of the proteins with trichloroacetic acid (TCA). The proteins are obtained as (TN-NPN)×6.38.

In the conventional preparation of CGMP on a laboratory scale by precipitation of whey proteins with TCA, the supernatant is purified by dialysis and then chromatography on a SEPHADEX gel. The fractions containing the sialic acids define a homogeneous peak and their collection leads to pure CGMP which contains on average 13% sialic acids in the case of a CGMP of bovine origin.

The purity of the various CGMPs may therefore be calculated from their content of sialic acids obtained as described above, expressed in % in relation to the pure bovine CGMP. In order to verify that these purity percentages do in fact correspond to reality, pure CGMP is isolated for each preparation by the conventional method. In each case, the collection of the sialylated fractions provides access to a product which, after freeze-drying, contains more than 10% sialic acids (Comparison Example, last line of the following Table). The residual lactose content is determined by chromatography on SEPHADEX G-50 gel using a 100 mM aqueous acetic acid solution as eluent.

EXAMPLE 1

20 kg bovine whey protein concentrate (WPC) are dispersed in 180 kg demineralized water. The concentrate has the following composition:

| | |
|---|---|
| Proteins | 73 |
| Lactose | 7.8 |
| Minerals | 2.8 |
| Lipids | 6 |
| CGMP | 5.4 |
| Water | balance to 100 |

300 g $CaCl_2 \cdot 2H_2O$ are added to the dispersion and its pH is adjusted to pH 6 with an 18% aqueous HCl solution. The dispersion is transferred to a double-jacketed stirred tank heated beforehand to 90° C. and is kept at that temperature with gentle stirring for 20 minutes. A gel is formed and is diluted with 40 kg demineralized water. After cooling to 25° C. and acidification to pH 4.5 by addition of an aqueous HCl solution, the dispersion is pumped into a centrifuge rotating at 9,000 r.p.m. A first supernatant containing 3.5% dry matter and a residue are collected. The residue is then dispersed in 20 kg water acidified to pH 4.5 with an 18% aqueous HCl solution and the resulting dispersion is centrifuged at 9,000 r.p.m. which gives a second supernatant containing 5.1% dry matter. After the two supernatants have been mixed, the mixture is ultra-filtered to half its volume in 75 minutes at a constant temperature of 35° C. in a module with a surface area of 4 $m^2$ of membranes having a nominal cutoff of 20,000 dalton equipped with a tank for recirculation of the retentate at an entry pressure of 7 bar and with a constant permeation rate of 120 l/h.

The permeate issuing from the module has a dry matter content of 0.5% and contains sialic acids making up 2% of the mixture entering the module. 125 kg demineralized water are then introduced into the module, compensating gradually for the permeate removed to allow constant-volume operation. After washing, ultrafiltration is terminated to reduce the volume of retentate in the recirculation tank to 23 l, i.e., 29 kg containing 16.5% dry matter. The liquid contained in the dead volume of the module is removed and the module is rinsed with demineralized water. This liquid and the washing waters make up 19 kg of additional retentate containing 7.9% dry matter. The total retentate corresponds to 48 kg containing 13.2% dry matter.

After dilution of the retentate to 100 kg with demineralized water, addition of 16.5 l absolute ethanol and pH adjustment to 4.5 with an aqueous HCl solution, the mixture is stirred gently for 30 minutes. A precipitate is formed and is then filtered. 110 l filtrate are obtained and are then concentrated to 28 l in an evaporator and freeze-dried. The 290 g of CGMP obtained contain 10.9% total sialic acids and 8.4% proteins.

COMPARATIVE EXAMPLE

For comparison purposes, CGMP is prepared
I. in accordance with EP-A 291 264,
II. similarly to the method described in FR-A 2 288 477, but without hydrolysis of the sialic acids, i.e., by following the procedure of Example 1, but without precipitation of the residual whey proteins with ethanol,
III. by precipitation of the whey proteins with trichloroacetic acid from the whey protein concentrate used as starting material in Example 1, followed by purification on a column of SEPHADEX G50 gel (TCA/G-50).

The analysis results of the products obtained are show in Table 1 below:

| Composition | | | CGMP | | Starting |
|---|---|---|---|---|---|
| (%) | I | II | III | Ex. 1 | WPC |
| Total nitrogen | — | 12.1 | 10.09 | 10.08 | 12.25 |
| Non-protein nitrogen | — | 1.46 | 10.09 | 8.76 | 0.81 |
| Proteins | — | 67.6 | 0 | 8.4 | 73 |
| TCA-soluble sialic acids | 5.2 | 1.9 | 13 | 10.9 | 0.7 |
| Lactose | — | 1.3 | 0 | 3.3 | 7.8 |
| Minerals | 11 | 2 | — | 2 | 2.8 |
| purity of CGMP | 40 | 15 | 1.00 | 84 | 5 |
| Sialic acid composition of a sample purified by TCA/G-50 (conventional laboratory method) | — | 13.4 | 13 | 11.8 | 12.8 |

Legend: —: not determined

The foregoing results show that the CGMP prepared in accordance with the invention is characterized by a content of minerals of less than 5%, a protein content of less than 10%, a sialic acid content of more than 10% and a purity of 84%. By contrast, the products from industrial processes lead to a purity of 40% (I) and even 15% (II).

EXAMPLE 2

The sialic acids present in CGMP are always attached to the disaccharide which forms the internal part of its glycan chains, namely the sequence Galβ1→3Gal-NAcα1→Ser/Thr. Accordingly, the desialylation of CGMP enables a product which exposes sialic acids and in which most of the galactose residues are masked to be converted into a product which exposes terminal β-galactosides and which therefore exhibits different properties.

To obtain desialylated CGMP, the CGMP of Example 1 is dissolved in a quantity of 5% by weight/volume in a 25 mM aqueous H₂SO₄ solution. After pH adjustment to 2 by addition of an aqueous H₂SO₄ solution, the solution is heated to 80° C. and is gently stirred at that temperature for 2 h. After intensive dialysis of the solution against pure water by means of a membrane having a cutoff power of 6,000-8,000 dalton, the product is freeze-dried. Its characteristics are as follows:

| | |
|---|---|
| Sialic acids | <1% |
| Galactose | 5% |
| N-acetyl galactosamine | 6.2% |

The monosaccharides are identified and detected by gas chromatography after hydrolysis and derivatization.

We claim:

1. A process for obtaining CGMP from a whey protein concentrate comprising adding and mixing ethanol to and with a retentate obtained from a whey protein concentrate at least partly freed from lactose and containing CGMP to obtain a precipitate and a supernatant, collecting the supernatant and then drying the collected supernatant to obtain CGMP.

2. A process according to claim 1 wherein the ethanol is added in an amount of from 5% to 25% by volume based upon a volume of the retentate, and further comprising adding an aqueous solution of an acid to obtain the pH of the retentate/ethanol mixture to a pH of from 4 to 5.

3. A process according to claim 1 or 2 further comprising concentrating the collected supernatant and then drying the concentrated supernatant.

4. A process according to claim 1 or 2 wherein the whey protein concentrate is a sweet whey.

5. A process according to claim 4 wherein the sweet whey has been ultrafiltered and diafiltered.

6. A process according to claim 1 or 2 wherein the whey protein concentrate has been subjected to demineralization.

7. A process according to claim 1 or 2 further comprising hydrolyzing the obtained CGMP to obtain desialylated CGMP.

8. A process according to claim 3 further comprising hydrolyzing the obtained CGMP to obtain desialylated CGMP.

9. A process according to claim 1 or 2 further comprising flocculating a whey protein concentrate at least partly freed from lactose and containing CGMP to obtain a first precipitate and a first supernatant, collecting the first supernatant and ultrafiltering the collected supernatant to obtain the retentate containing CGMP to which the ethanol and acid are added and mixed.

10. A process according to claim 9 wherein the whey protein concentrate is a sweet whey and further comprising diafiltering the ultrafiltered supernatant to obtain the retentate.

11. A process according to claim 9 further comprising demineralizing the whey protein concentrate.

12. A process according to claim 9 wherein the whey protein concentrate is flocculated at a pH of about 6 and further comprising adding CaCl₂ to the concentrate in a amount sufficient to obtain a concentration of free calcium ions in the concentrate in an amount above 5 mM, adding demineralized water to the flocculated concentrate to dilute the concentrate, acidifying the diluted concentrate to a pH of 4.5 and then collecting the first supernatant and wherein the first supernatant is ultrafiltered through membranes having a nominal cutoff power of from 5,000 to 20,000 dalton and further comprising diafiltering the ultrafiltered supernatant to obtain the retentate.

* * * * *